Patented June 13, 1950

2,510,971

UNITED STATES PATENT OFFICE 2,510,971

PYROXITE COMPOSITIONS

Harvie W. Goddin, Washington, D. C.

No Drawing. Application August 31, 1944,
Serial No. 552,216

12 Claims. (Cl. 106—60)

During extensive mineralogical researches I have discovered a new mineral, to which the name "Pyroxite" has been given. The mineral appears to consist largely of silica, also containing smaller amounts of alumina, ferric oxide, magnesia, potash and soda, free water (water which is driven off by heating at 100° C. for an hour) and combined water (water which can be driven off only by heating to temperatures between 100° and 800° C.). The iron is largely not a part of the silicate mineral.

The mineral (taken from the quarry in massive form) contains about 11.4% of small voids, and has an apparent specific gravity of about 2.182. This would correspond to a sepcific gravity of the grain, of about 2.463. The mineral crushes rather easily, e. g. in a roller mill, giving (when reduced to 100 to 200 mesh) a powder, the visible particles of which are of flake-like structure. When so crushing the mineral, say to 100 mesh, 150 mesh or 200 mesh, as much as 35–45% of the mineral passes into particles so fine that they are invisible under the microscope, hence it cannot be stated what the particle shape of this 35-45% may be. The particles of such fine ground mineral, however, which are visible, are plate-like. A sample of 200 mesh powder had an apparent specific gravity of 1, that is, a 100 c. c. receptacle filled with the powder, after being shaken down by tapping, contained 100 grams of the powder. When thoroughly disintegrated, a very large fraction (practically all of it) was found to be composed of sub-microcoscopic particles of not over a half micron in diameter.

The mineral as taken from the quarry shows no stratification. On cleavage surfaces, such as cracks, there is often a thin film of soft manganese mineral which has been rejected by the mineral in its formation.

The material is of a buff color, both in the massive state and powdered condition. The powdered material has a micaceous feel (somewhat resembling powdered talc) when the hand is pushed down into a receptacle containing a mass of the powder. Due to the small size of the crystals, it has not been possible to accurately state the exact refractive indices of the crystals. These are approximately 1.56, 1.59 and 1.60.

When pyroxite is heated slowly to high temperatures, with weighing at frequent intervals, there are pronounced shoulders on the loss-of-weight curve, at about 200° C. and 400° C. In this respect there is a similarity to the minerals palygorskite and attapulgite, in the saponite group.

The mineral, in massive form (i. e. native), does not absorb water to any substantial extent. Hence blocks of this mineral, exposed to rain, freezing, sun, air, etc., do not absorb water sufficiently to crack or disintegrate the same. In other words, it is weather-resistant to a high degree. The particles of the ground mineral also do not absorb water.

The above discussion (to which the invention is not limited) is based on examination of many samples from a large deposit at Stanley, Page County, Virginia, and I have not found deposits of this mineral elsewhere.

The absorption of water by this material is very slight, so that a block of material, weighing about 60 lbs., after lying in a brook for some months, was taken out of that water, and at once dropped into a crushing mill, and crushed as readily as a dry piece, and without the formation of a mud.

Small pieces (say 2 inch size) of the massive mineral pyroxite, after soaking in water for about a year, removed from the water were completely wet on the outside. Some of these pieces were then broken open and there appeared to be no absorption of water by the surface portions of the pieces. The mineral does not break down or disintegrate, when exposed alternately to cold water and hot sun. This shows a complete absence of weathering.

The pyroxite, whether in the form of a powder or in massive form is chemically inert as regards alkalies, lime, Portland cement, water, oils, etc. When treated with strong acids, especially when hot, these acids react only with free ferric oxide or hydroxide present, and the main body of the pyroxite (the silicate) is not attacked, to any substantial extent, at least.

Due to non-absorption of water, pyroxite shows no capillarity (e. g. in mortars, or by itself).

The pyroxite is highly refractory. An acetylene flame was directed at a central point on one side of a cast panel made by drying a paste of pulverized pyroxite and 35% of water. This was continued for 25 minutes, whereby the said part of the panel surface became somewhat glazed, but the pyroxite did not fuse nor was the panel broken, buckled, misshapen, nor otherwise seemingly injured by such treatment. The heat was localized and the margins of the panel (about an inch from the so heated area) did not become strongly heated. Thus it appears that molded pyroxite particles act as a heat insulator.

A similar panel made from 100 pyroxite, 2 to 3% of slaked lime and about 37% water, made by the same method into a shaped body (panel) gave similar results. With this lime added, the toughness, resistance to abrasion, and resistance to scuffing are slightly increased, but the reistance to moisture, and resistance to fire are decreased slightly. The resistance to acids would also be decreased. The strength (especially torsional strength) would not be altered. The specific gravity might be reduced a little.

The mineral in the quarry drills easily, particularly with some water added in the drill hole, and the drill rotated, the mud of this water with fine pyroxite cuttings easily coats the interior of the bore hole. Similar to a well mudded bore hole, giving a very slick inner surface to the bore hole, over which the drill rod (and other tools if used) slide easily. This also waterproofs the surface of the bore hole (e. g. it muds off the cracks).

A peculiar property of powdered pyroxite which is of great importance is the extreme ease with which it mixes with certain other powdered materials. When fine pyroxite powder is added to dry Portland cement, only very little shoveling or hoeing or other mechanical agitation is needed to produce a complete and intimate mixture of the two materials. This has been repeatedly demonstrated, and in various proportions between 20 of the cement to 1 of pyroxite on one hand, and 1 of cement to 20 of pyroxite on the other. It thus mechanically promotes the mixing of aggregates.

Here (and throughout the present case) proportions are stated by volume.

Such mixtures of dry cement and dry pyroxite (both fine powders) are referred to below in admixture with sand, crushed stone, gravel, etc. There is a great advantage in mixing the cement and the pyroxite at the cement mill, because the mixture of cement and pyroxite is much less affected by dampness in the atmosphere than is cement alone. As a test of this, I placed in an open bag, a mixture of Portland cement containing 5% (by volume) of pyroxite. In a similar open bag I placed the Portland cement alone. Both bags were then placed, side by side, on a shelf in a damp cellar. After some months, the bag of pure cement had hardened to a solid hard lump, whereas the other bag of cement and pyroxite mixture had not lumped at all or deteriorated, and was found to mix thoroughly with water, forming an excellent cement grout. The powdered pyroxite can accordingly be looked upon as a preservative for the cement, to prevent the cement from absorbing atmospheric moisture during shipment and storage.

The pyroxite is chemically inert. It does not appear to react chemically, with lime, cement, plaster, or other common materials to which it is added, while dry, and only slightly (if at all) when wet.

In the following, numerous formulas are given, and in these, parts and percentages are given by volume, since the workers ordinarily measure out (rather than weigh) the components of such mixtures.

An important use of the pulverulent pyroxite is as an improver in mortars and concretes of all kinds. For mixing this with Portland cement, lime, calcined plaster (calcareous mortar-forming component) alone or with sand (and optionally with coarse aggregate such as crushed stone, gravel, slag, etc.) only a relatively slight effort is needed. In other words, much less active effort is needed for producing the dry and wet mixing of the components, when pyroxite is added to the mix. This is due to what I term the "crawling activity" of the pyroxite.

The mortar shows a much greater ease of mixing and spreading, if pyroxite is included in the mix. Both the setting and the final hardening, both of mortars and concretes, take place in the normal manner but the drying is accelerated due to reduced water content in the mortar. When pyroxite is used in mixtures with Portland cement, the objectionable fine cracks are absent or less apparent, after hardening, as compared with neat cement alone. The same is true also in mixtures of calcined gypsum, or this with lime, used without sand.

*Example 1.*—An example of a good standard mortar formula is 1 gallon of Portland cement (dry basis)
1 gallon of pyroxite (dry basis)
3 gallons of sand (dry basis)
4 gallons of water Using the sand in a normal moist condition, less water than 4 gallons could be used (e. g. 1 gallon up to 4 gallons).

*Example 2.*—For a leaner mortar, up to five gallons of sand could be used. One-fourth gallon to 1½ gallons of the pyroxite could be used in this formula. In this formula, the sand is best sharp sand, but can be of round grains (with about 42% of voids).

Example 1 deals particularly with a standard mortar.

*Example 3.*—As an example of a richer mortar I may use 2 gallons Portland cement (dry basis)
1 gallon pyroxite (dry basis)
3 gallons good sand (dry basis)
4 gallons water

*Example 4.*—Another lean mortar mix would be 4 gallons of sand (this can be poor sand)
1 gallon of pyroxite
1 gallon of cement (all dry basis)
4 gallons water

*Example 5.*—For a standard lime mortar (for laying brick etc.), I can use 2 gallons slaked lime
3 gallons good sand (dry)
1 gallon pyroxite
4 gallons of water

*Example 6.*—For a standard plaster mortar (brown coat, for inside use)

2 gallons slaked lime
3 gallons of sand (dry)
1½ gallons pyroxite
4 gallons water The sand could be increased to 4 gallons, if a leaner mortar is wanted.

*Example 7.*—An excellent mixed mortar for chimneys, stucco work and the like, would be 1 gallon lime
1 gallon cement
5 gallons sand (dry)
1½ gallons pyroxite
4 gallons of water This can be used for lining the chimney and fire places.

*Example 8.*—For a rough coat lime plaster (e. g. for second coat on a brown coat), I can use 2 slaked lime
1 pyroxite
2 sand
3 to 4 water

*Example 9.*—For a smooth coat lime plaster (e. g. for a second coat or top coat, to be applied on a brown coat), I can use 3 slaked lime
1 pyroxite
3 water If desired I can dust pyroxite on this mortar while being spread on the wall, and this can be troweled during the dusting, to give a pattern. For this dusting, other pigments or colors can be used with the pyroxite, if desired.

With pyroxite added in mortars, about one-half less than the usual amount of water is needed, to give the same spreading properties. This is because pyroxite, in powdered form (as in massive state) does not absorb water, and because of its microscopic structure, it infiltrates the voids.

Masonry and plaster so including pyroxite is weather proof, frost proof, and free from expansion, to a high degree, reasonably acid proof and reasonably fireproof.

Pyroxite powder is an excellent addition to lime mortar (e. g. for plastering walls or for laying brick) giving an ease of mixing and an ease in spreading and increasing the cohesion and adhesion of the mortar. The mortar-surfaced wall so made, after drying, will be tougher, stronger and less liable to cracking, than ordinary lime or cement mortar.

In mortars containing sand, an amount of pyroxite up to 5% (based on the lime or cement) and in mortars not containing sand, an amount of pyroxite up to 3% (based on the lime or cement) does not considerably affect the color of the finished wall.

*Example 10.*—Pyroxite alone, crushed to pass a 200 mesh screen with water added to form a mortar which can be used to form an excellent furnace lining material, in place of fire brick, or as a cement for laying up fire brick, in furnaces of all types, e. g. in boiler furnaces, calcining furnaces, metallurgical furnaces, heat-treating furnaces, etc. It forms an excellent refractory. For this purpose the pyroxite should be ground to at least 200 mesh (and in such a material 35–40% of the material will be sub-microscopic particles). To three parts of this fine powder, about one part of water will form a mortar which can be readily troweled into place as a furnace lining. After drying it does not expand or contract or deteriorate or scuff, is not affected by chemical action from fuel, and has stood temperatures up to 4500° F., without slagging, or deteriorating. It can be applied to hot or cold parts of new or old furnaces. Heat may be applied at once, without deteriorating such linings. This mortar can be applied on metal or on bricks. It can also be poured or cast into forms or shaped (bricks, arches, etc.).

For furnace lining the pyroxite is mixed with water to thin troweling consistency, and the interior of the furnace is coated with a layer of the mixture, to a thickness of 1/8 to 3 inches, more or less. It is often helpful to add, e. g. 1 to 2% of lime to the pyroxite, e. g. before adding the water. These mixtures adhere well to fire brick or metal. This lining will dry in a short time and will permit the materials in the furnace (fuel, ore, fluxes, clinkers, ashes, etc.) to slide downwardly in the furnace with less attachment to the furnace wall. The furnace may be treated when cold or warm or even when parts of the furnace are hot. For coating a hot furnace wall, the mix has to be made more fluid.

These mixtures can also be used for patching furnace linings where some of the bricks have become worn, chipped, spalled or broken, to avoid an entire new lining, and to stop any further fire-erosion.

For making up a pyroxite mortar for furnace linings, it is often advisable to use some salt in the water. This can be $NaCl$, $CaCl_2$, $MgCl_2$, $FeSO_4$, alum, $KFe(SO_4)_2$, etc. The amount of such salts may be 1 to 3% (based on the water). The effect of such salt is to increase the glazing effect and to increase the hardness of the lining produced.

*Example 11.*—250 mesh pyroxite mixed with 30 to 40% of its bulk of water, with or without a little added lime (3–10%), to form a pyroxite mortar, makes a good furnace cement, for patching up rough surfaces on fire bricks, metal work, etc. It can be plastered into cracks in fire bricks or metal parts of furnaces, stoves, etc. or for filling cracks in furnace walls, or for covering rough spots.

*Example 12.*—With water alone (33% of water is a suitable amount), pyroxite powder forms an excellent luting material for various purposes. Other components, such as colored pigments, 3–10% of lime or cement, or sand, clay, etc., in any amount, can be added.

These luting materials can be applied to rough surfaces, cracks, etc., while the base is cold or warm or hot.

For luting a metal crack, while red hot, pyroxite with 15% to 33% of water gave a very satisfactory seal.

*Example 13.*—Pyroxite mortar also is a valuable material for lining calcining furnaces for alkali (e. g. in the pulp and paper industry) also for lining wooden or metal tanks for holding alkali solutions and other liquids, also for lining tanks for holding vinegar, sugar liquors, etc.

*Example 14.*—Tanks for making or storing pickles, for soaking pickling cucumbers or the like in salt brine, or for holding vinegar in the pickle factory, can be made of lumber and lined with a thin layer of a paste made from pyroxite and water (to which 5% of Portland cement can be added, based on the pyroxite, if desired) and then dried. Such tanks will last much longer than plain wooden tanks.

*Example 15.*—The pulverized pyroxite is an excellent base for cold water paint. Thus a cold water paint can be made from 1 gallon of 3–4% casein solution (in a 10% or 20% sodium bicarbonate solution), 3 gallons of pulverized pyroxite, 1/2 gallon of dry slaked lime, if desired, and 7 gallons of water, all well stirred together. This water paint can have other pigments or dyes added, if desired. It can be used on plaster walls, brick, tile or board walls, beaver board walls, cement walls, both in interior finish and exterior finish, where protected from direct rain. Without added colors, it gives an ivory to a light buff color, which is permanent. Where applied on a porous brick wall (exterior) of a poorly constructed building through which wall (before treatment) a great deal of cold wind had come in, the trouble from such cold wind was effectively prevented, (This was on an open porch having a roof which prevented washing by rain.)

*Example 16.*—In other tests it was shown that the proportions could be varied, as follows (still giving a good cold water paint):

|  | Volumes |
|---|---|
| Pyroxite | 100 |
| Lime | 0 to 300 |
| Casein (or other adhesive) | 0 to 50 |
| Water | 170 to 800 |

In place of casein, glues, sulphite waste liquor, starch (raw or modified) or starchy vegetable matter, adhesive matters of various kinds, dextrin, gums, thickeners, etc., could be substituted. Or these could be omitted.

*Example 17.*—For a wash or paint for coating brick or other masonry walls, coating or lining chimneys, fire places, etc., a mixture of 9 parts of pyroxite, 1 part Portland cement or slag cement or lime, and about 6 to 7 parts of water (all by volume) has been shown to give very satisfactory results. The proportions of pyroxite and cement also can vary between 9 to 1 and 1 to 9. Lime and/or sand also can be added (with proportionately more water). Such coatings are waterproof, frostproof, weatherproof and proof against acid gases, and will not peel.

*Example 18.*—Another formula is 2 pyroxite, 2 cement or lime and 6 of water.

*Example 19.*—The powdered pyroxite can be applied, with enough water to form a thick or thin paste (with or without a little lime, cement or plaster), on all masonry walls or structures. Such mixtures can be applied with a trowel or brush or otherwise, in any desired thickness. Or an excess of the lime or cement, equal to 5 to 15% of the amount of pyroxite, with or without sand or other filler, can be used.

*Example 20.*—For use as a thin slurry (say 1 part pyroxite powder and 3 water, applied by a brush), I prefer always to add 5% to 15% of lime or cement, to give a harder surface.

*Example 21.*—A simple cold water paint for walls etc. of all kinds can be made by mixing 100 parts of pulverized pyroxite (200 mesh or finer) with 70–78 parts of water. This can be further ground in a ball mill if desired but this is not necessary.

*Example 22.*—For a satisfactory oil paint, 100 volumes of powdered pyroxite are mixed, e. g. in a ball mill, with oil, and oil and drier added, up to 250 volumes. The drier may be turpentine, tung oil or other driers, equal to 15–20% of the amount of oil. During manufacture, the pyroxite should best be ground to 300 mesh, more or less. Such paints can be applied to any kind of surfaces, e. g. structural iron, or steel, concrete, brick, tin plate, wood, etc. It can be applied in hot or cold weather. It is also resistant to acids, corrosive gases, etc. Colors or pigments can be added.

*Example 23.*—For a wash on brick, tile or concrete walls, applied with a brush, I may use 2 gallons of dry Portland cement, 1 gallon of pyroxite and 2 to 4 gallons of water. This gives excellent fireproofing, proofing against chemical action, freezing and moisture and good cohesion and adhesion. Where waterproofing is not needed I can use an equal amount of lime instead of cement. But a smaller amount of the pyroxite can be used, in many cases, e. g. one-fourth to one-half of the amount of lime or cement.

In applying a wash of this kind, due to the small amount of water added, more water can be added from time to time, to replace water lost by evaporation.

In many of the above formulas, I have shown water as the liquid to be used. This can be fresh or salt water (clear or muddy) or mine water, preferably neutralized, depending on what is available at the particular job.

Other liquid or liquefiable materials, such as drying or semi-drying fatty oils or mixtures of these with nondrying oils, asphaltic petroleum, asphalt, bitumen, tars, creosotes or other tar distillates of petroleum or tar residua, can be used.

*Example 24.*—A very satisfactory paste paint was made by mixing 10 volumes of very finely ground pyroxite with about 10 to 13 volumes of linseed oil (both with and without driers). For this, the 200 mesh pyroxite can be air floated to give a material passing 400 mesh, and the oversize further ground in a ball mill. Later, another 10–13 parts of oil is incorporated for a thin paint. These paints were found satisfactory on wood, iron and other metals, brick, tile, tin cans, stone and cement. The articles to be coated were both warm and cold. The paint dried normally. In other cases I used from 12 to 17 parts of linseed oil, to 10 of fine pyroxite.

*Example 25.*—For coating a road surface, 1 volume of the 200 mesh powdered pyroxide was mixed with 1 to 4 volumes of warm asphalt. This was spread on the road and compacted. 5–10% of cement was preferably added to the pyroxite.

*Example 26.*—In some cases I may dust ground pyroxite (e. g. 100 to 200 mesh) mixed with 50 to 100% of dry Portland cement, over a freshly spread asphalt road surface, and then roll in the usual way.

*Example 27.*—As a dry dusting of a freshly laid (unset cement road or walk, pyroxite, with or without cement and/or lime, can be used. Then this is troweled over in the usual way. This, after drying, may be of a light buff color. When so used on a road, it may cover the entire road surface or may be applied as a stripe or line, of any desired width. After drying such a stripe, the color persists. The mark so formed is permanent, and helpful to drivers at night and in foggy weather and rainy weather.

*Example 28.*—Mixtures of asphalt, bitumen, tar, or residues thereof, mixed with pyroxite, can be used for waterproofing brick or tile walls (inside or outside), for roofing etc. In such mixtures the proportions can vary between wide limits, e. g. 100 asphalt and 10 to 100 of pyroxite.

In asphalt, tar, bitumen, etc. mixtures, the use of pyroxite assists in preventing injury by water, frost, freezing, expansion, contraction, etc.

*Example 29.*—For making artificial slates or shingles for roofing, e. g. the cement and asbestos type, the addition of up to 10% or 15% of powdered pyroxite, is advantageous.

*Example 30.*—In dry pressed or wet pressed refractory bricks, I may add small or large amounts of pyroxite to the mix, e. g. 5% to 15% of pyroxite in making a silica brick, magnesia brick, chrome brick, etc.

*Example 31.*—In clay bricks (e. g. for house construction) I may add 2% to 10% of pyroxite to the clay. This addition may help to make the clay more easily workable (more plastic in the process of extrusion of the clay mix). It makes the bricks stronger and lighter in weight, and waterproofs, frost-proofs, prevents erosion and spalling.

*Example 32.*—In making various articles from clay on the potter's wheel (e. g. flower pots, bowls, jars, etc. and for making tiles, pipes, etc. by extrusion, the addition of 2-5% of pyroxite to the dry clay, and intimately mixing (e. g. in the pugmill), is advantageous, giving better plasticity to the wet clay and giving stronger and more perfectly formed products.

*Example 33.*—In the art of making "whiteware" (table dishes, etc.), the pyroxite may be added to the porcelain raw mixes, or to the glaze mixes. For some purposes, the pyroxite may be first deferruginized by hydrochloric and/or sulphuric acid, if the color is objectionable. Amounts up to 10% and 15% (of the dry mix) can be so added. This reduces crazing and checking, and cracking, to a substantial extent, also increases strength and toughness, reduces weight, improves the molding, prevents spalling under spinning and pressing. Warm water can be used in the mixing steps, particularly in winter time. Salt water can be used.

*Example 34.*—In a glazing composition for ceramic products, I can make a dry mix including feldspar, salt, quartz, greenstone and/or pyrophyllite, with 5 to 15% of powdered pyroxite. This mix is well ground. Water can be added to make a slip, for glazing potteryware, etc.

Examples 30 to 33 cover uses of pyroxite in certain different forms of ceramics. I use this term to embrace refractories, molded products such as brick, tile, etc., pots, dishes, etc. made from clay or earthy material by a molding or shaping process, usually followed by a burning process, whether or not accompanied by a glazing treatment.

*Example 35.*—A drilling fluid (termed drilling mud) for use in drilling wells (oil and gas wells, water wells, etc.) can be made by adding up to 40 or 50% of pyroxite to fresh or salt water, or by adding to known drilling muds, an amount of pyroxite equal e. g. to 25 to 75% of the amount of solids in such muds. Or during ordinary rotary drilling I can add dry pyroxite powder or lumps, into the lower part of the drill hole. This tends to give a greater degree of slickness to the mud wall being deposited on the interior of the bore hole, and the plate-like structure of the pyroxite particles strengthens the mud wall, and prevents friction on the tools.

Pyroxite is useful in all kinds of concrete. It increases the strength, toughness, water-proof properties, frost-resistance of all forms of concrete. Examples follow.

*Example 36.*—For a strong concrete, for various uses, I may use 1 volume powdered pyroxite 150 or 200 mesh, 1 volume dry Portland cement, 2 volumes dry sand, and 4 volumes of gravel or crushed stone. Add 3 to 5 volumes of water, and mix well.

*Example 37.*—For a very rich concrete, I would employ 1 pyroxite, 2 cement, 2 sand and 3 gravel (all dry basis).

*Example 38.*—For a neat cement mortar, I recommend 2 pyroxite, 2 cement and 3 water. After setting and hardening, the work will be found to be free from fine cracks. Hence water cannot enter and freeze. This composition is especially good for use under water or in very damp places.

*Example 39.*—Cement wash, for use on bricks, plaster, walls, floors, roads, to smooth up etc. 2 pyroxite, 2 to 3 of cement and 5 to 7 of water.

For use on asphalt roads, asphalt base macadam roads, as well as for cement concrete roads, etc., pyroxite is a valuble material, both in the original pavement-making mass, and as a top dressing to be applied after the first rolling and before the final rolling.

*Example 40.*—In the cement or concrete mix (cement, sand, stone and water), I can add pyroxite equal in amount to 5 to 10% or more of the volume of the dry cement.

*Example 41.*—In the asphalt mix (asphalt, sand, stone, etc. to be laid hot) I can add pyroxite in any amount e. g. 2 to 5% or more of the volume of the asphalt.

Example 42.—The road, after the first rolling or compacting may be dusted over (while the cement mix is still wet or while the asphalt is still soft) with a mixture 50 cement and 1-3 pyroxite. Then roll this into the road surface. This aids in keeping out water, hence waterproofs and frost-proofs the road, prevents expansion and contraction by change of temperatures.

*Example 43.*—In grinding Portland cement clinker, add to the clinker going into the grinder, 5% up to 10% of pyroxite, in the form of pebbles (broken pieces). With these materials can be added any of the usual additions (e. g. gypsum, for controlling the setting time, and/or hardening accelerators). The ground cement is less subject to deterioration by dampness from the atmosphere during shipment and storage, than ordinary Portland cement.

When this cement is mixed with sand or other aggregate and water, improved pozzuolanic properties are imparted to the mortar or concrete. The pozzuolanic properties can be further improved by adding more pulverulent pyroxite in making the mortar or concrete.

*Example 44.*—A mixture of pyroxite with about 10% of lime or cement and enough water to form a stiff plastic makes an excellent filling for holes in trees (i. e. tree-surgery). Sand may be added if desired. Packed into a hole in the tree it hardens and sets, and does not shrink away from the growing wood. There is no shrinking or swelling or checking or cracking, in the plug so formed.

*Example 45.*—For patching furnace linings of different types I can use 90% powdered pyroxite and 10% of carbon black; or powdered gray cast iron or powdered pyrophyllite, or powdered slate, or powdered feldspar, or powdered soap stone, or powdered greenstone, or powdered celestine or powdered barite, optionally with 5% or less of lime. The mixture can be ground, mixed with water to form a soft paste or stiff mud and applied to the cracks, rough spots, etc., in a furnace lining.

*Example 46.*—50% pyroxite and 50% coke, ground to a 200 mesh powder or finer. Add water to form a paste. Mold a retort for melting alumina or ores from this paste.

*Example 47.*—Powdered pyroxite (200 mesh) and sawdust (preferably fine) are mixed in equal amounts, together with 5% to 25% of cement (more or less, based on the volume of the sawdust) to form a uniform mixture. Water is added sufficient to form a stiff paste, which is then molded into slabs, blocks, beams, boards, planks, etc. After drying, these are used in interior trim in houses, buildings, etc. Much larger amounts of sawdust can be used. Lime can be substituted for cement.

This artificial lumber has good heat-insulating and sound-insulating properties. Chopped excelsior can also be added.

*Example 48.*—100 slate or similar stone, as a powder or as a mixture of powder and granules, 50 powdered pyroxite, 25 Portland cement, and optionally 5-25 of short fibered asbestos, mixed with water to form a thin paste, and pressed into the form of slates, for roofing, in place of slate. Holes to receive nails can be pressed into the pieces when making the slates. Such a mixture (which may contain a larger amount of slate or stone chips) may be used as a motar or concrete for basement floors, or can be molded into slabs for door-steps, covers or treads for same, floors, walks, etc.

I call attention to the fact that in the above formulas, proportions are stated by volume.

For most uses, I prefer to grind the pyroxite to substantially all pass a 200 mesh screen. When so ground the mineral works far better than when only ground to pass a 100 mesh screen or a 150 mesh screen. But when the mineral is ground to pass a 100 mesh screen, a considerable fraction (e. g. about 30%) will pass a 150 mesh screen, and a substantial portion (e. g. 10%) will consist of sub-microscopic particles.

Pyroxite is a mineral, having structure and properties described above. It cannot be (so far as I am advised) produced synthetically.

*Example 49.*—Pyroxite is a useful addition to diatomite and diatomite mixtures. As an example, 100 parts of powdered diatomite (which may have been treated according to any of the conventional processes for improving same, or untreated) is mixed with about 10 to 25 parts of pyroxite of 200 mesh size. Add water or other liquid to make a stiff mortar. Press this into slabs, sheets, blocks or other shapes, then dry. The product is useful for heat insulation, sound insulation, etc. Pieces molded to brick or tile sizes and used (one or several courses) between fire brick and red brick, in furnace or stack linings. Or these bricks can be used as furnace linings, for some types of furnaces.

*Example 50.*—Pyroxite can be used as a filler in resin plastics, alone or with other mineral and/or organic fillers.

I claim:

1. A fluid to plastic composition containing the mineral pyroxite in a finely divided condition and a vehicle.

2. A composition as in claim 1, said mineral pyroxite being in the form of a powder mostly passing a screen of at least 100 mesh, and the visible particles of which are flake-like in structure.

3. A composition adapted for being shaped, containing the mineral pyroxite in the form of a fine powder and another mortar-forming component, in an aqueous vehicle, the latter being in amount sufficient to give such composition a paste-like to fluid consistency.

4. A composition of matter adapted for coating or molding purposes, containing the mineral pyroxite in a pulverulent composition, an aqueous liquid, and a mortar-forming component which contains a calcium compound.

5. A composition of matter adapted for coating or molding purposes, containing the mineral pyroxite in a pulverulent condition, and a mortar-forming component which contains a calcium compound.

6. A fluid to plastic composition comprising pulverulent pyroxite and an oily vehicle.

7. A ceramic mix containing pulverulent pyroxite.

8. A composition containing finely divided pyroxite and water containing dissolved saline matter.

9. A mortar containing powdered pyroxite.

10. A concrete containing powdered pyroxite.

11. A molded artificial product containing finely divided pyroxite as a component.

12. As a new material, pyroxite in a finely divided state, substantially all passing a 200 mesh screen, and of which material at least 25% is in the form of particles of submicroscopic size, such material being adapted for being easily mixed with mortar constituents to give a mortar of good working properties.

HARVIE W. GODDIN.

REFERENCES CITED

The following references are of record in the file of this patent:

UNITED STATES PATENTS

| Number | Name | Date |
|---|---|---|
| 1,396,986 | Berg | Nov. 15, 1921 |
| 1,619,785 | Reveridge | Mar. 1, 1927 |
| 1,978,923 | Wiener et al. | Oct. 30, 1934 |
| 1,987,221 | Stroehike | Jan. 8, 1935 |
| 2,017,904 | Keeth | Oct. 22, 1935 |
| 2,246,452 | McGrew | June 17, 1941 |
| 2,345,598 | Hartsell et al. | Apr. 4, 1944 |

FOREIGN PATENTS

| Number | Country | Date |
|---|---|---|
| 1,684 | Great Britain | 1890 |
| 21,456 | Great Britain | 1897 |
| 337,605 | Great Britain | 1930 |
| 447,452 | Great Britain | 1936 |

OTHER REFERENCES

Engineering and Mining Journal-Press, "Zonolite: Utilizing a Useless Mineral," Nov. 21, 1925, pp. 819–820, vol. 120, No. 21.